United States Patent [19]

Kokubo et al.

[11] 4,245,256
[45] Jan. 13, 1981

[54] VIDEO PROJECTOR AND MOUNTING STRUCTURE

[75] Inventors: Takashi Kokubo, Akabanenishi; Yoshiaki Takano, Koganei; Minoru Okuda, Ohyaguchikita, all of Japan

[73] Assignee: Sony Corporation, Tokyo, Japan

[21] Appl. No.: 75,024

[22] Filed: Sep. 13, 1979

[30] Foreign Application Priority Data

Sep. 20, 1978 [JP] Japan ............................ 53-129277[U]

[51] Int. Cl.³ .............................................. H04N 5/64
[52] U.S. Cl. ................... 358/254; 312/7 TV; 358/60
[58] Field of Search ............... 358/60, 64, 254; 312/7 TV, 21, 24, 25, 224, 226, 313, 350

[56] References Cited

U.S. PATENT DOCUMENTS

| | | | |
|---|---|---|---|
| 2,566,830 | 9/1951 | Goldsmith | 312/226 |
| 3,944,734 | 3/1976 | Ogawa | 358/254 |

*Primary Examiner*—Benedict V. Safourek
*Assistant Examiner*—Michael Allen Masinick
*Attorney, Agent, or Firm*—Hill, Van Santen, Steadman, Chiara & Simpson

[57] ABSTRACT

A color video projector as disclosed which includes a cabinet having a depressed top deck, and a mirror carrying L-shape mounting board pivotally carried by a pair of slidably movable arms, guide grooves on the side edges of said top deck and guide pins protruding from the mounting board ride in the guide grooves during withdrawal of the mounting board. The board can only be rocked to its upright position when the arms are fully extended and can only be rocked back to its original position when the arms are fully extended and from which position the mounting board can be pushed back into the cabinet with the mirror above the top deck.

5 Claims, 9 Drawing Figures

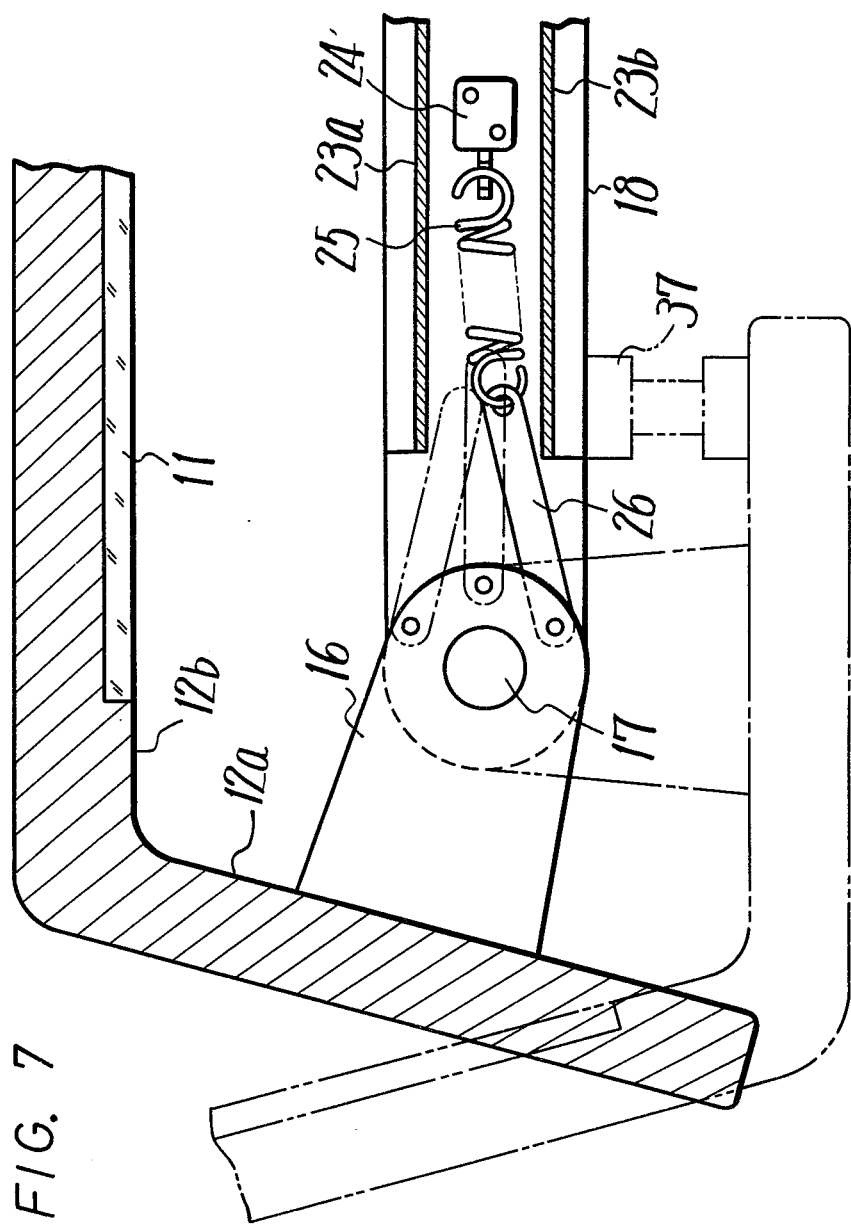

VIDEO PROJECTOR AND MOUNTING STRUCTURE

BACKGROUND OF THE INVENTION

1. Field of the Invention

This invention relates generally to a video projector and is directed more particularly to a color video projector which has three cathode ray tubes for producing three primary color images of red, blue and green colors separately.

2. Description of the Prior Art

There is known a color video projector of the projection type for magnifying a video image, for example, a color image on a color cathode ray tube and projecting it upon a screen.

FIGS. 1, 2 and 3 show a typical prior art example thereof in which red, green and blue primary color images are obtained separately and then projected through two lens devices to form a color image, and it is called a two-eyed three-tube type projector.

In the figures, numerals 1R, 1G and 1B represent color cathode ray tubes for producing red, green and blue primary color images, respectively, which are disposed within a projector body 2, for example, as shown in FIG. 2. In the figures, numerals 3 and 4 denote lens devices, 5 a dichroic mirror and 6 a screen, respectively.

In order to minimize as much as possible the space occupied by the projector, including the screen 6, and to make the adjustment of the optical system unnecessary, it is sufficient that the screen 6 be mounted, for example, on a part of the projector body 2 as illustrated. This arrangement will require a mirror 7 because a color image cannot be projected directly upon the screen 6.

The mirror 7, for reasons of the related optical distance or the like, should be mounted on a mounting board 8 and positioned outside the projector body 2 such as in the manner illustrated. Thus, when the projector is not being operated, it is desirable for the mirror to be, for example, housed or replaced in the projector body 2 to avoid damage and to give a pleasing appearance.

With the above prior art projector, when the projector is used, it is necessary that the mounting board 8 be withdrawn from the projector body 2. In this case, it is necessary that the mounting board 8 be moved outwards in the direction indicated by an arrow A in FIG. 3 and then rotated in the direction indicated by an arrow B. At this time, if the mounting board 8 is erroneously rotated before it is moved outwards, a lower end edge 8a of the mounting board 8 abuts against the upper end edge of a front panel 2a of projector body 2. Thus, there occurs the objectionable features that the front panel 2a and/or a movable arm 18, which is pivoted on a support 16 fixed to the board 8 at a pivot pin 17, are damaged.

OBJECTS AND SUMMARY OF THE INVENTION

Accordingly, an object of the invention is to provide a novel color video projector.

Another object of the invention is to provide a color video projector free from the defect inherent in the prior art.

A further object of the invention is to provide a color video projector in which when a mounting board is housed in a projector body, it is not rotated or opened until it is moved outwards.

According to an aspect of the invention, there is provided a video projector for projecting an image of a cathode ray tube through a mirror onto a screen in a magnified scale, in which a mounting board with a mirror attached thereto is linked to a movable arm which supports and moves the mounting board to be opened or closed relative to a cabinet for an engaging piece to operate in the vertical direction, the engaging piece being pushed in upon the closing operation of the mounting board, being stopped in its forward movement when the movable arm slides to the opening and closing operating position of the mounting board, and being stopped in its forward and backward movements upon the opening operation of the mounting board.

Other objects, features and advantages of the present invention will become apparent from the following description taken in conjunction with the accompanying drawings through which like references designate the same elements and parts.

BRIEF DESCRIPTION OF THE DRAWINGS

FIG. 7 is a side cross-sectional view showing, in an enlarged scale, the mounting board shown in FIG. 6;

DESCRIPTION OF THE PREFERRED EMBODIMENT

An example of the color video projector according to the present invention will be hereinafter described with reference to FIGS. 4 to 9.

Figure 4:
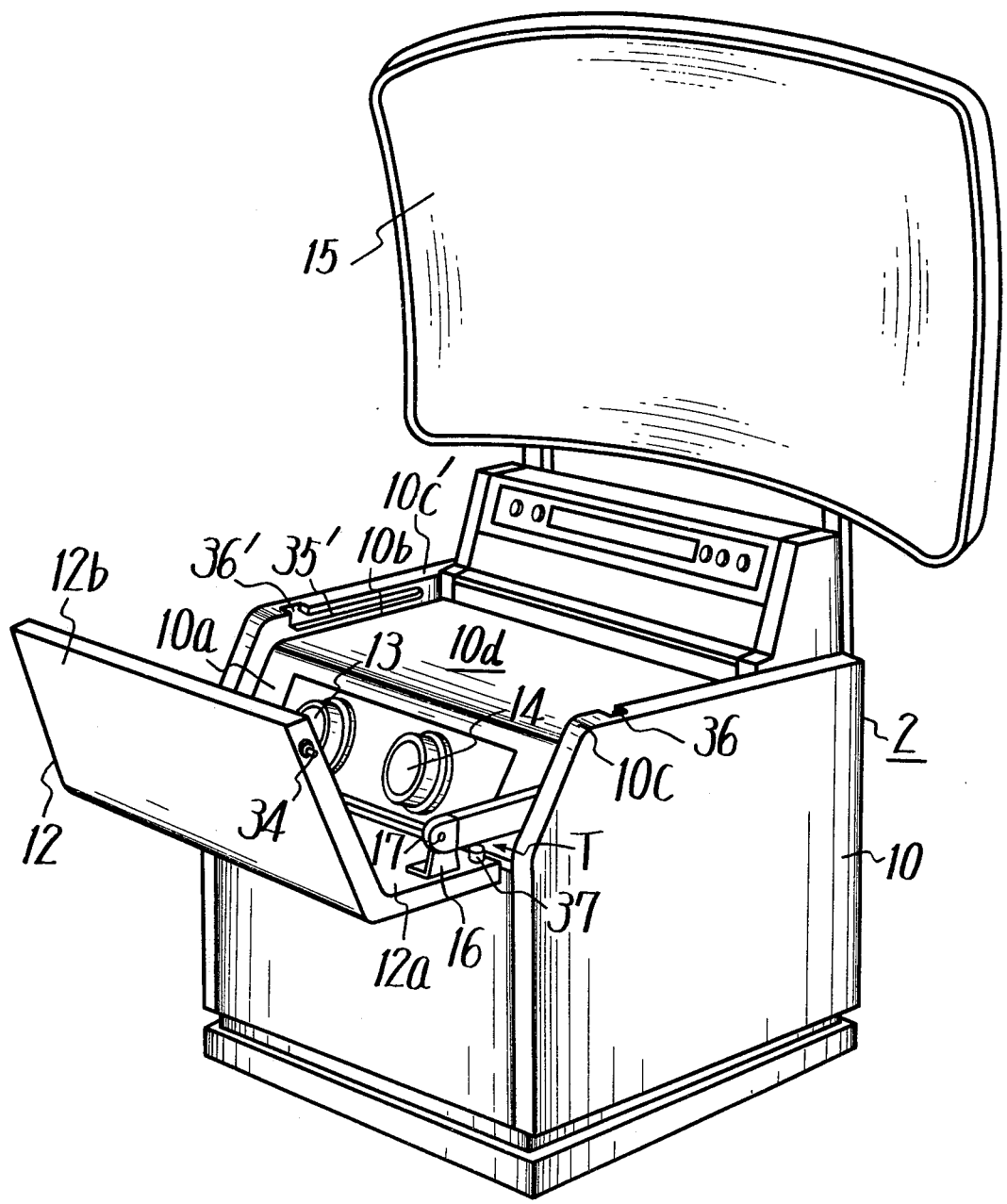
FIG. 4 is a perspective view showing an example of a color video projector according to the invention.
Figure 5:
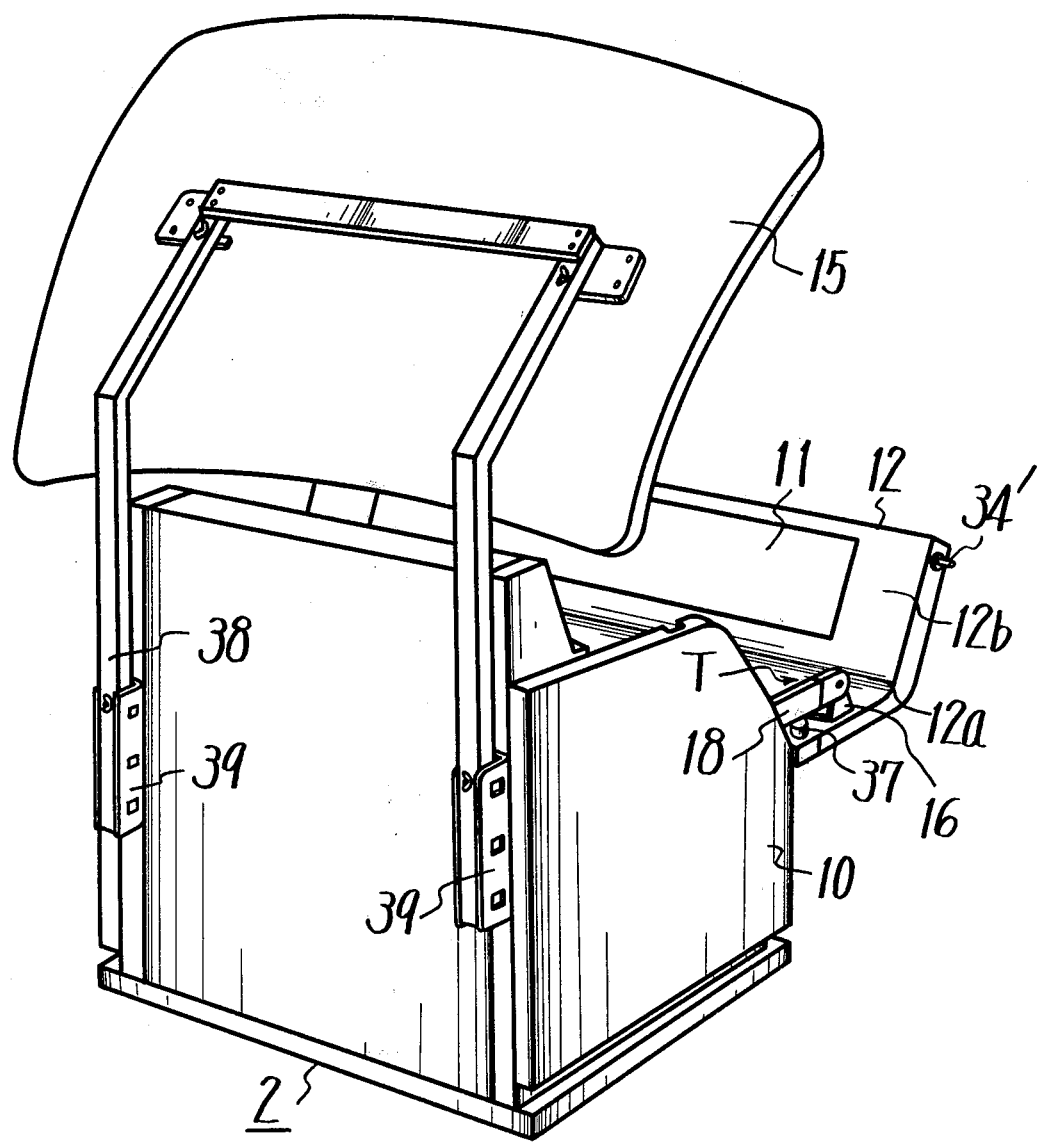
FIG. 5 is a perspective view showing the color video projector of FIG. 4 viewed from its back.

Referring to FIGS. 4 and 5, there is shown a cabinet 10 of the projector body 2, the cabinet 10 having formed a step-like recess 10d including a front upper-half surface 10a and a top surface 10b by leaving both side edge members 10c and 10c' along the side edges of the surfaces 10a and 10b. Into this recess 10d is fitted a mounting board 12 on the inner surface of which a mirror 11 is mounted.

This mounting board 12 is opened by an opening and/or closing device T so that the mirror 11 will reflect and project images from two lens devices 13 and 14 positioned in the front upper-half surface 10a of the cabinet 10, into a screen 15 which is attached at the rear upper part of the cabinet 10. That is, the mounting board 12 is formed to be of substantially L-shape in section to have a one-half part 12a corresponding to the front upper-half surface 10a of the cabinet 10 and the other half-part 12b corresponding to the top surface 10b thereof. Into the inner surface of the other half-part 12b is fixedly embedded the mirror 11 to be flush therewith, and to the inner surface of the one-half part 12a is secured a pivot support 16. This pivot support 16 may be formed by die casting in order to provide sufficient strength.

Figure 1:
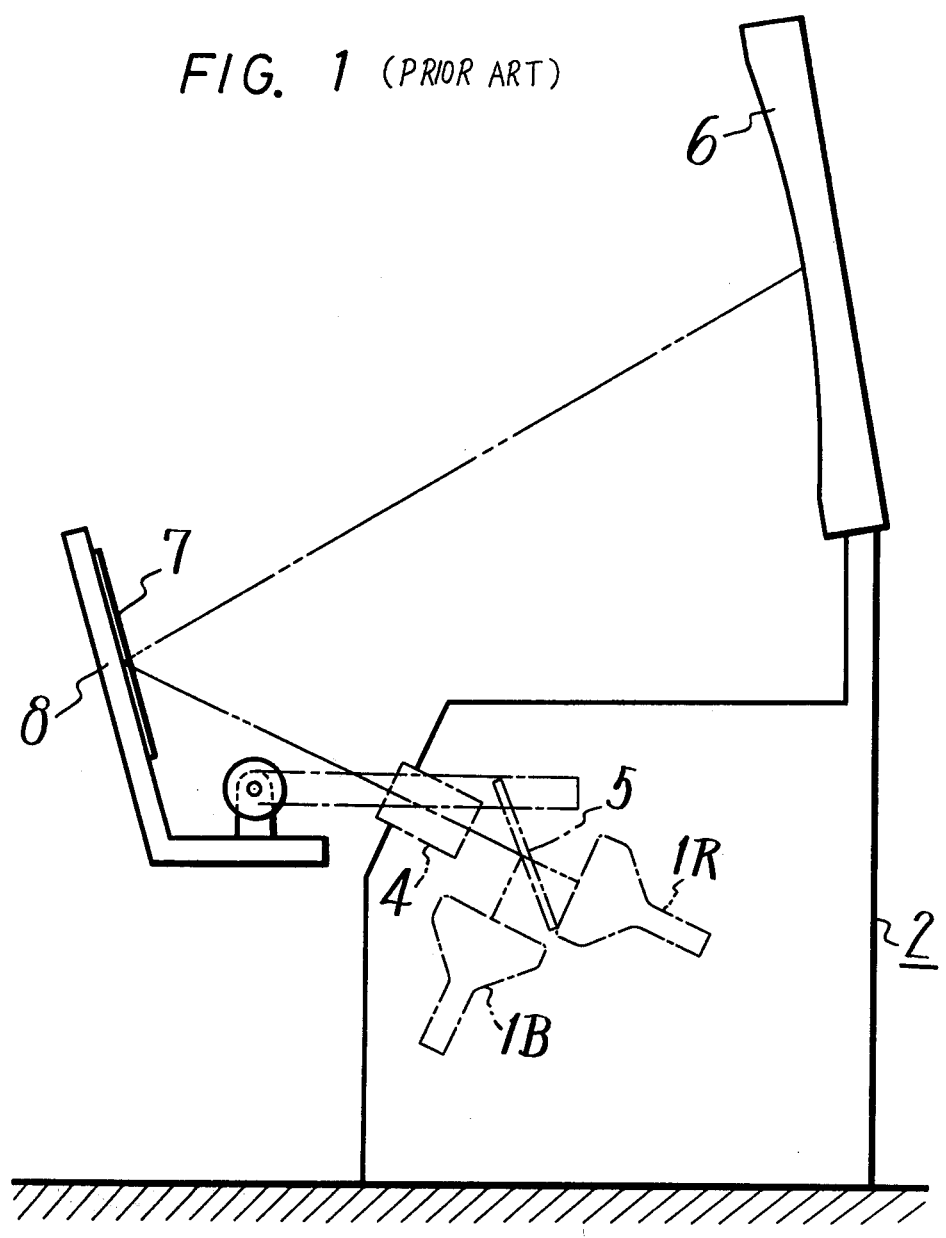
FIGS. 1 to 3 are respectively schematic diagrams showing a prior art color video projector.
Figure 2:
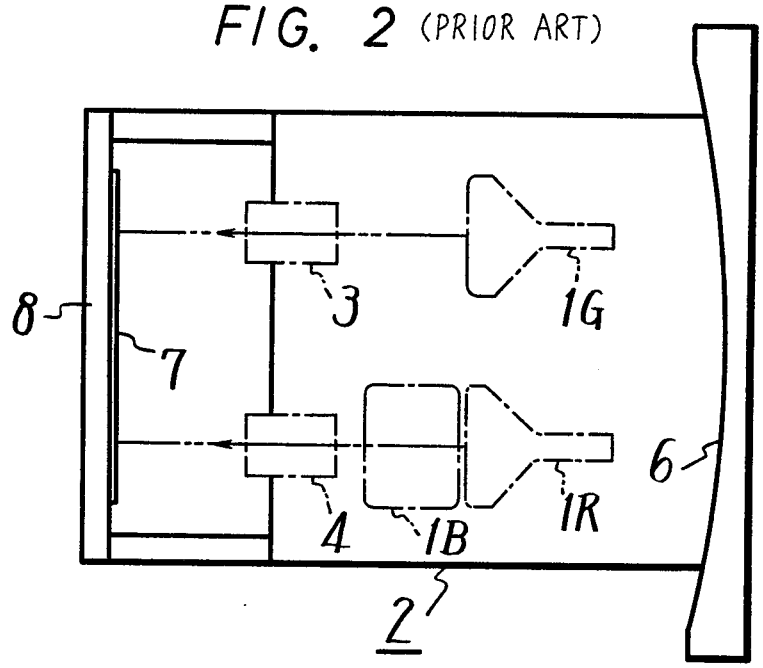
Figure 6:
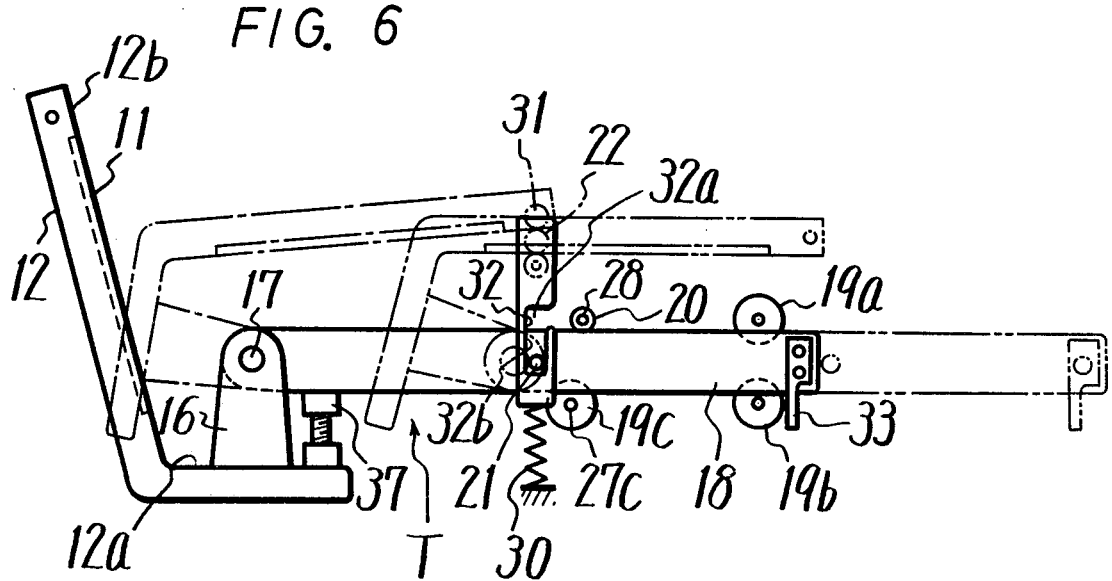
FIG. 6 is a side view showing, in an enlarged scale, the mounting board opening and closing device used in the example of the invention shown in FIG. 4.
Figure 3:
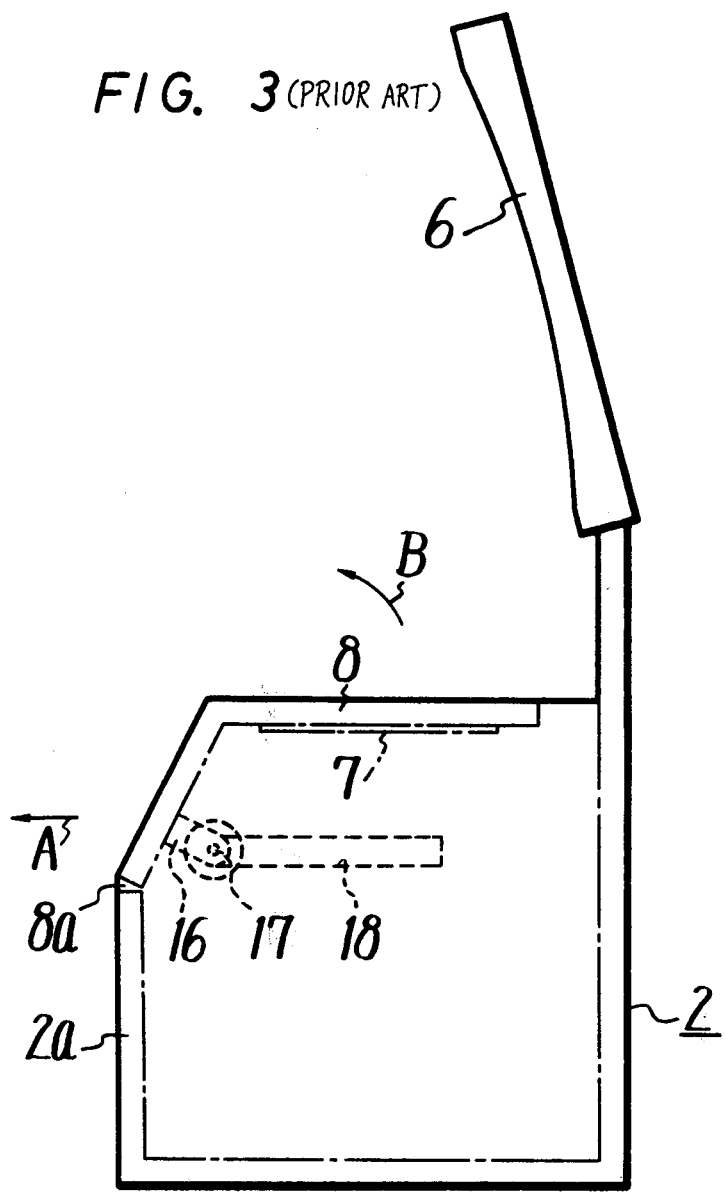
Figure 8:
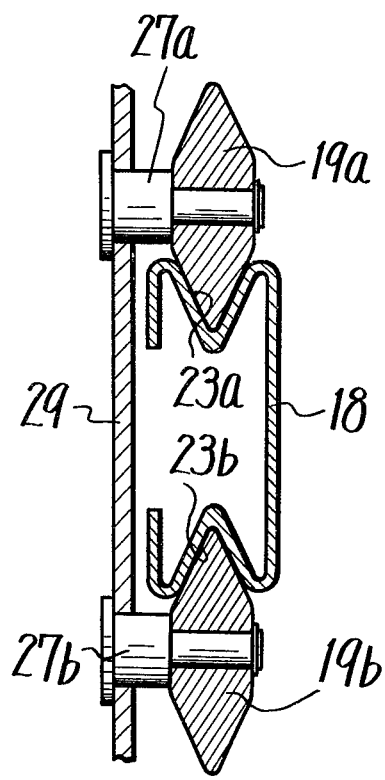
FIG. 8 is a cross-sectional view showing, in an enlarged scale, the movable arm used in the embodiment shown, for example, in FIG. 7.

As shown clearly in FIG. 6, the opening and/or shutting device T consists of a movable arm 18, which is supported at its forward end by the pivot support 16 through a pivot pin 17 and which is slid forward and backward with respect to the cabinet 10, first, second and third guide rollers 19a, 19b and 19c for supporting and guiding the movable arm 18 to be substantially horizontal to the cabinet 10, a pushing roller 20, which is positioned to oppose the third guide roller 19c and made in rotary contact with the upper surface of the movable arm 18, and an engaging piece 22 which is moved up and down in the direction substantially perpendicular to the movable arm 18, and which, when the movable arm 18 is moved to reach the forward extreme, comes into engagement with an engaging pin 21 provided projectively in the movable arm 18, thereby preventing the movable arm 18 from forward and backward sliding. As shown in FIG. 8, the movable arm 18 is shaped hollow to have V-shaped guide grooves 23a and 23b at the upper and lower surfaces or edge surfaces along the longitudinal direction, respectively.

Inside the front end portion thereof is disposed a coil spring 25 of which the back end is engaged with a fastening piece 24 and of which the front end is attached to a link 26, as shown in FIG. 7. The front end of the link 26 is pivotally connected in the vicinity of the pivotal portion of the pivot support 16 to exert a biasing force on the pivot support 16. The direction in which this coil spring 25 pulls the pivotal portion of the pivot support 16 is established as follows. That is, the mounting board 12 on which the mirror 11 is attached is so heavy as to exert a rotational force on the movable arm 18 thereby to rotate it about the pivot pin 17 as the pivotal portion of the pivotal support 16 whether the mounting board 12 is closed (as indicated by the solid lines in FIG. (7) or opened (as indicated by the two-dot chain lines in FIG. (7). In this case, the movable arm 18, under both closed and opened states, is rotated in opposite directions, respectively, and the opposite rotational forces will be neutralized or cancelled when the mounting board 12 is at a balanced midway position. The coil spring 25 is positioned or selected to provide zero elastic force when the rotational forces are neutralized (as indicated by one-dot chain line in FIG. 7), and extended between the pivot support 16 and the movable arm 18 so as to be pulled, upon the rotation of the board 12 in each direction, to balance the mounting board 12 by applying a biasing force thereto and thereby to automatically stop the mounting board 12 even at any conditions.

The guide rollers 19a, 19b and 19c guiding and supporting the movable arm 18 are each formed in a convex shape, or an abacus-bead shape to fit the V-shaped guide groove 23a, 23b of arm 18 as shown in FIG. 8. The first and second guide rollers 19a and 19b are disposed at the back side of the movable arm 18 to vertically hold it therebetween, and the third guide roller 19c is disposed at the front of the arm 18 to support it at its lower surface. On the other hand, the pushing roller 20 is disposed opposing the third guide roller 19c to be in rotative contact with the upper surface of the movable arm 18. These rollers 19a, 19b, 19c and 20 are mounted on a chassis 29 (refer to FIG. 8) by way of shafts 27a, 27b, 27c and 28 so that the movable arm 18 is slidable in the horizontally forward and backward directions to the cabinet 10. in this arrangement, the pushing roller 20 can be of course, replaced by such a guide roller as mentioned above.

As shown in FIG. 6, the engaging piece 22 is disposed to be slidable in the direction perpendicular to the movable arm 18, or in the vertical direction, and biased by a spring 30 so that the top end of the piece 22 can project from the top surface 10b of the cabinet 10. In addition, the engaging piece 22 is attached at its top end with a wheel 31 by way of a pivot shaft, and has an inverted L-shaped engaging groove 32 formed at its mid portion so that, when the engaging piece 22 is pushed in, the groove 32 is opposed to an engaging pin 21 which is provided projectively on the movable arm 18. When the mounting board 12 has fallen forward so that the surface part 12b on which the mirror 11 is mounted is laid on the top surface 10b of the cabinet 10, the engaging piece 22 is pushed in by way of the wheel 31. When, with such a condition being kept, the mounting board 12 is pulled out to such an extent that the movable arm 18 is slid forward to insert the engaging pin 21 in a horizontal portion 32a of the engaging groove 32 and thereby to be locked. Then, when the mounting board 12 is raised to open, the engaging piece 22 is released from the pushed-in condition and moved upward by the spring 30. Thus, the engaging pin 21 is engaged with an engaging groove 32b of the groove 32, thereby preventing the movable arm 18 from forward and backward sliding. In this condition, a stopper 33, which is secured at a position on the rear end portion of the movable arm 18, is opposed to the guide roller 19b on the back side as described above so as to keep a minute amount of spacing therefrom. This means that if the movable arms 18 are suddenly slid forward, the stopper 33 strikes against the guide roller 19b, preventing the movable arms 18 from unnecessary, forward sliding, so as not to shock the engaging piece 22.

The opening and shutting device T with the above construction is provided on both sides of the mounting board 12, thereby enabling smooth forward/backward and opening/closing operations of the mounting board 12.

Figure 9:
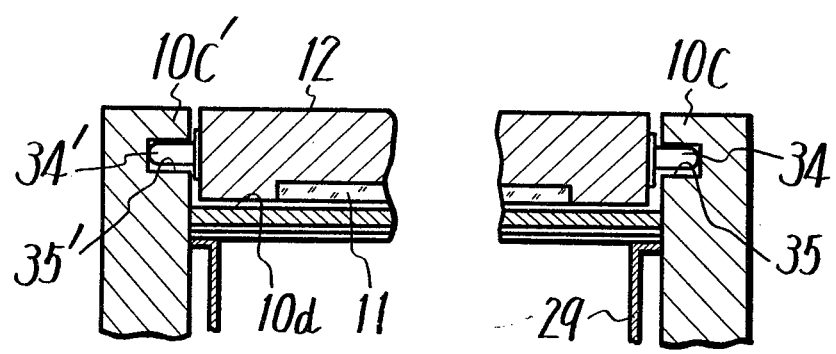
FIG. 9 is a cross-sectional view showing a part of the projector when the mounting board is housed in the projector body.

In the inner surfaces of both side edge portions 10c and 10c' located on the top surface of the cabinet 10, there are formed, substantially horizontal in the forward/backward direction, guide grooves 35 and 35', which are to be engaged with guide pins 34 and 34' projectively provided to be rotatable on both side end portions of the mirror-mounting part 12b of the mounting board 12 (refer to FIG. 9). At the front end portions of these guide grooves 35 and 35' there are provided continuously escape grooves 36 and 36' (refer to FIG. 4) through which the guide pins 34 and 34' can escape upwardly so that the mounting board 12 can be raised up under the condition that the movable arm 18 is stopped in engagement with the engaging piece 22. Adjusting screws 37 project at a distance backward from the pivot supports 16 which is fastened on the part 12a of the mounting board 12 or at positions opposite to the movable arms 18 (refer to FIGS. 6 and 7), so that, when the mounting board 12 is raised to be opened, the same are made in contact with the undersides of the movable arm 18. The angle at which the mirror-mounting surface 12b is raised can be thus adjusted by changing the height of the adjusting screws 37. In the drawings as shown in FIG. 5, numeral 38 represents supporting arms for the screen 15, and 39 fastenings for attaching the supporting arms 38 to the cabinet 10.

The operation of the embodiment of the invention with the above construction will now be described. FIGS. 4 and 5 each show the condition that the mounting board 12 is raised to its operating position and the projector is ready to project.

First, when the mounting board 12 is pulled forward while the same is in a replaced condition, or left fallen to fit in the recess 10d which is formed from the front upper half surface to the top surface of the cabinet 10, the movable arm 18 is slid forward in accordance with the movement of board 12. At this time, the mounting board 12 is not raised because the guide pins 34 and 34' are engaged with the guide grooves 35 and 35' on both side edge portions 10c and 10c' of the cabinet 10. If the mounting board 12 is pulled out until the engaging pin 21 is engagedly inserted in the horizontal part 32a of the engaging groove 32 of the engaging piece 22, the guide pins 34 and 34' reach the escape grooves 36 and 36' at the front end of the guide grooves 35 and 35' and are thus released from the engagement, allowing the mounting board 12 to be raised. Therefore, the rising of the board 12 is made by the biasing force from the coil spring 25 extended between the pivot shaft 16 and the movable arm 18, so that the mirror-mounting part 12b is floated from the recess 10d of the cabinet 10. In this condition, the front half-portion 12a of the mounting board 12 is greatly separated from the front surface 10a of the cabinet 10 or separated more widely than the lengthwise width of the front portion 12a. Then, the mounting board 12 is further raised against the biasing force from the coil spring 25 until over the position at which the elastic force is zero, so that the mirror mounting part 12b is raised up for the mirror 11 to face the screen 15. The adjustment of the mirror 11 to proper angle of reflection and projection is carried out by turning the adjusting screws 37 to change the slope of the mounting board 12. In this way, the mirror 11 is set up, and then images from the lens devices 13 and 14 are reflected by the mirror 11 so as to be projected onto the screen 15.

When it is desired to replace the mirror 11 from the above position, the mounting board 12 is pivotally moved downwardly to engage the guide pins 34 and 34' with the escape grooves 36 and 36', respectively, and to bring the lower part surface of the mirror mounting part 12b of the mounting board 12 into contact with the top surface 10b of the cabinet 10. Thus, the engaging piece 22, at this time, is pushed in or down and thereby the vertical part 32b of the engaging groove 32 is moved downward to a position lower than that of the engaging pin 21 of the movable arm 18, the horizontal part 32a being opposed to the engaging pin 21. Then, when the mounting board 12 is pushed backward, the engaging pin 21 is slipped out of the horizontal part 32a of the engaging groove 32 of the engaging piece 22 with the result that the movable arm 18 can be slid backward. The mounting board 12 is moved backward along the guide grooves 35 and 35' and eventually fitted into the recess 10d of the cabinet 10.

At this time, even though the mounting board 12 is pushed backward while being in the raised condition, the engaging piece 22 is force up to maintain the vertical part 32b of the engaging groove 32 in engagement with the engaging pin 21 of the movable arm 18. The movable arm 18 is thus prevented from backward sliding with the result that the mounting board 12 cannot be replaced in the recess.

In this embodiment, the mounting board 12 on which the mirror 11 is mounted can be drawn out of or pushed into the cabinet 10 so long as the mounting board 12 is left in the fallen state, and the raising and opening of the mounting board 12 can be performed when the board 12 is completely pulled out of the cabinet 10. In addition, the mounting board 12, when it has been returned to its original place, is united with the cabinet 10 to form a part of the panels of the cabinet.

In accordance with the present invention as described above, the movable arms 18 serve to support and move the mounting board 12 on which the mirror 11 is mounted, in order to permit the mounting board 12 to be opened and closed with respect to the cabinet 10, and the engaging piece 22 is disposed to move in the vertical direction to the movable arm 18. The engaging piece 22 is pushed in by falling of the mounting board 12, and when the movable arm 18 is slid to the position at which the mounting board 12 is to be opened or closed, the movable arm 18 is stopped by engagement not to slide forward. When the mounting board 12 is in the open state, the movable arm 18 is stopped by engagement not to slide forward and backward, thereby prevented from unnecessary sliding or backward movement when the mounting board 12 is opened or closed by pivotal movement with respect to the movable arm 18.

The pivotal movement of the mounting board 12 can be smoothly performed and the mirror 11 can be maintained at the proper position while the mounting board 12 is open, thereby effecting accurate reflection and projection of images. In addition, when the mounting board 12 is replaced in the cabinet 10, the mounting board 12 cannot be moved backward while being open, so that the replacing operation can be performed safely without the risk of striking the mirror 11 against the cabinet 10 and damaging the mirror 11.

While the embodiment of the invention as described previously employs the mirror-mounting board of an L-shape in section, the shape of this mounting board may be varied. Moreover, while the device according to the present invention is used for a two-eyed three-tube type projector, the number of cathode ray tubes and lens devices used is not limited thereto.

It will be apparent that many modifications and variations could be effected by one skilled in the art without departing from the spirit or scope of the novel concepts of the present invention.

We claim as our invention:

1. A color video projector comprising a cabinet, said cabinet having a step-like recess including a front upper half surface and a top deck having side edges defining a track along the sides of said top deck, a mounting board of substantially L-shaped, a mirror on the inner surface of said mounting board at a point where it lies over said top deck, a pair of support arms for said mounting board slidably mounted on said track, said mounting board being slidably movable out of and into position over said top deck, said cabinet having means restraining said mounting board from upward movement and from rocking movement except when said mounting board is in a predetermined fully-out position, said mounting board being rockable about the forward end of said support arms, and means for preventing rocking of said mounting board except when said mounting board is in its outer position in front of said cabinet.

2. A video projector for projecting an enlarged image of an image of a cathode ray tube through a path including a mirror onto a screen, a mounting board with a mirror attached thereto being pivotally linked to a pair of movable arms which support and move said mounting board guide grooves on said cabinet, guide pins projecting from said mounting board into said guide grooves, said guide grooves having escape openings for said pins when said mounting board is in its forward position, an engaging latch piece movable in a vertical direction, said engaging latch being pushed in during the closing operation of said mounting board, and means for restraining said mounting board from being raised except when it is in its forward position.

3. A color video projector comprising a cabinet, said cabinet having a step-like recess including a front upper half surface and a top deck having side edges defining a track along the sides of said top deck, a mounting board of substantially L-shape, a mirror on the inner surface of said mounting board at a point where it lies over said top deck when retracted, means for supporting said mounting board for movement from a position over said top deck, to a position in front of said cabinet, means normally confining said mounting board to movement only in a substantially horizontal plane until said mounting board is in its outer position in front of said cabinet, means permitting raising said mounting board and for permitting rocking movement of said mounting board, and means preventing a return movement of said mounting board until its original position is attained with said mounting board lying with its mirror in a plane parallel to said top deck.

4. A color video projector comprising a cabinet having a step-like recess, including a front upper half recess check and a top surface, a substantially L-shape mounting board having a portion which overlies said recess check where in a non-operational position, a pair of mounting board supporting arms slidably carried by cabinet and mounted for movement in a plane parallel of said top surface, the outer end of each of said arms being linked to said mounting board to support said board, means limiting the outward movement of said arms at a point where said mounting board is in front of said cabinet, a vertically movable latch which normally prevents upward movement of said mounting board until release by the operator, spring means biasing said latch to a position where said mounting board cannot return to its position above said top surface of said cabinet, and a manually adjustable stop which determines the operating position of said mounting boards.

5. A color video projector according to claim 4, in which said latch is spring biased to its latched position.

* * * * *